United States Patent
Yancey et al.

(10) Patent No.: US 8,368,423 B2
(45) Date of Patent: Feb. 5, 2013

(54) HETEROGENEOUS COMPUTER ARCHITECTURE BASED ON PARTIAL RECONFIGURATION

(75) Inventors: Jerry Yancey, Rockwall, TX (US); Aya N. Bennett, Rockwall, TX (US); Timothy M. Adams, Campbell, TX (US); Mathew A. Sanford, Bryan, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 554 days.

(21) Appl. No.: 12/655,181

(22) Filed: Dec. 23, 2009

(65) Prior Publication Data

US 2011/0153981 A1 Jun. 23, 2011

(51) Int. Cl.
*H03K 19/173* (2006.01)
*H03K 19/177* (2006.01)

(52) U.S. Cl. .................. 326/38; 326/39; 712/15; 712/17

(58) Field of Classification Search .............. 326/37–41, 326/47
See application file for complete search history.

(56) References Cited

U.S. PATENT DOCUMENTS

| | | | |
|---|---|---|---|
| 4,528,658 A | 7/1985 | Israel | |
| 5,361,373 A | 11/1994 | Gilson | |
| 5,737,235 A | 4/1998 | Kean et al. | |
| 5,802,290 A | 9/1998 | Casselman | |
| 5,838,167 A | 11/1998 | Erickson et al. | |
| 5,931,959 A | 8/1999 | Kwiat | |
| 5,941,988 A | 8/1999 | Bhagwat et al. | |
| 5,946,219 A | 8/1999 | Mason et al. | |
| 5,953,372 A | 9/1999 | Virzi | |
| 6,020,755 A | 2/2000 | Andrews et al. | |
| 6,075,380 A | 6/2000 | Lane | |
| 6,172,927 B1 | 1/2001 | Taylor | |
| 6,201,829 B1 | 3/2001 | Schneider | |
| 6,233,704 B1 | 5/2001 | Scott et al. | |
| 6,259,693 B1 | 7/2001 | Ganmukhi et al. | |
| 6,292,923 B1 | 9/2001 | Genrich et al. | |
| 6,333,641 B1 | 12/2001 | Wasson | |
| 6,339,819 B1 | 1/2002 | Huppenthal et al. | |
| 6,381,238 B1 | 4/2002 | Hluchyj | |
| 6,385,236 B1 | 5/2002 | Chen | |
| 6,389,379 B1 | 5/2002 | Lin et al. | |
| 6,421,251 B1 | 7/2002 | Lin | |
| 6,496,291 B1 | 12/2002 | Raj et al. | |
| 6,496,505 B2 | 12/2002 | La Porta et al. | |

(Continued)

FOREIGN PATENT DOCUMENTS

GB 2377138 A 12/2002

OTHER PUBLICATIONS

Laxdal, "ELEC 563 Project Reconfigurable Computers", http://www.ece.uvic.ca/~elaxdal/Elec563/reconfigurable_computers.html; printed from the Internet Dec. 19, 2003, Dec. 2, 1999, 10 pgs.

(Continued)

*Primary Examiner* — Shawki Ismail
*Assistant Examiner* — Jany Tran
(74) *Attorney, Agent, or Firm* — O'Keefe, Egan, Peterman & Enders LLP (57) ABSTRACT

Systems and methods for partial reconfiguration of reconfigurable application specific integrated circuit (ASIC) devices that may employ an interconnection template to allow partial reconfiguration (PR) blocks of an ASIC device to be selectively and dynamically interconnected and/or disconnected in standardized fashion from communication with a packet router within the same ASIC device.

22 Claims, 6 Drawing Sheets

U.S. PATENT DOCUMENTS

| | | |
|---|---|---|
| 6,614,267 B2 | 9/2003 | Taguchi |
| 6,617,877 B1 | 9/2003 | Cory et al. |
| 6,651,225 B1 | 11/2003 | Lin et al. |
| 6,668,361 B2 | 12/2003 | Bailis et al. |
| 6,721,313 B1 | 4/2004 | Van Duyne |
| 6,754,881 B2 | 6/2004 | Kuhlmann et al. |
| 6,873,180 B2 | 3/2005 | Bentz |
| 6,888,376 B1 | 5/2005 | Venkata et al. |
| 6,901,072 B1 | 5/2005 | Wong |
| 6,934,763 B2 | 8/2005 | Kubota et al. |
| 6,965,571 B2 | 11/2005 | Webber |
| 6,993,032 B1 | 1/2006 | Dammann et al. |
| 7,003,585 B2 | 2/2006 | Phong et al. |
| 7,020,147 B1 | 3/2006 | Amadon et al. |
| 7,035,228 B2 | 4/2006 | Baumer |
| 7,111,110 B1 | 9/2006 | Pedersen |
| 7,137,048 B2 | 11/2006 | Zerbe et al. |
| 7,188,283 B1 | 3/2007 | Shafer et al. |
| 7,224,184 B1 | 5/2007 | Levi et al. |
| 7,260,650 B1 | 8/2007 | Lueckenhoff |
| 7,389,487 B1 | 6/2008 | Chan et al. |
| 7,404,170 B2 | 7/2008 | Schott et al. |
| 7,415,331 B2 | 8/2008 | Dapp et al. |
| 7,426,599 B2 | 9/2008 | Yancey et al. |
| 7,439,763 B1 | 10/2008 | Kavipurapu et al. |
| 7,444,454 B2 | 10/2008 | Yancey et al. |
| 7,453,899 B1 | 11/2008 | Vaida et al. |
| 7,506,297 B2 | 3/2009 | Mukherjee et al. |
| 7,518,396 B1 | 4/2009 | Kondapalli et al. |
| 7,577,726 B1 * | 8/2009 | Conard et al. ............... 709/221 |
| 2002/0021680 A1 | 2/2002 | Chen |
| 2002/0057657 A1 | 5/2002 | La Porta et al. |
| 2002/0059274 A1 | 5/2002 | Hartsell et al. |
| 2002/0095400 A1 | 7/2002 | Johnson et al. |
| 2003/0009585 A1 | 1/2003 | Antoine et al. |
| 2003/0026260 A1 | 2/2003 | Ogasawara et al. |
| 2003/0167340 A1 | 9/2003 | Jonsson |
| 2004/0085902 A1 | 5/2004 | Miller et al. |
| 2004/0131072 A1 | 7/2004 | Khan et al. |
| 2004/0156368 A1 | 8/2004 | Barri et al. |
| 2004/0158784 A1 | 8/2004 | Abuhamdeh et al. |
| 2004/0240468 A1 | 12/2004 | Chin et al. |
| 2004/0249964 A1 | 12/2004 | Mougel |
| 2005/0044439 A1 | 2/2005 | Shatas et al. |
| 2005/0169311 A1 | 8/2005 | Millet et al. |
| 2005/0175018 A1 | 8/2005 | Wong |
| 2005/0183042 A1 | 8/2005 | Vogel et al. |
| 2005/0242834 A1 | 11/2005 | Vadi et al. |
| 2005/0248364 A1 | 11/2005 | Vadi et al. |
| 2006/0002386 A1 | 1/2006 | Yik et al. |
| 2007/0101242 A1 | 5/2007 | Yancey et al. |
| 2007/0109105 A1 * | 5/2007 | Ohno et al. ............... 340/425.5 |
| 2007/0194807 A1 * | 8/2007 | Reblewski et al. ............. 326/38 |
| 2007/0276959 A1 | 11/2007 | Yancey et al. |
| 2008/0117908 A1 | 5/2008 | Kuo et al. |
| 2009/0072858 A1 * | 3/2009 | D'Souza et al. ............... 326/47 |
| 2011/0025376 A1 * | 2/2011 | Grittke et al. ............... 326/40 |
| 2011/0154012 A1 * | 6/2011 | Kusmanoff et al. ........... 713/100 |

OTHER PUBLICATIONS

"PCI/DSP-4 Complete Channels of Digital Acoustic Emission Data Acquisition on a Single Board", http://www.pacndt.com/products/Multichannel/pcidsp.html, printed from the Internet Dec. 19, 2003, 3 pgs.

Zaiq Technologies, "Innovation: Methodology Briefs", http://www.zaiqtech.com/innovation/m_fpga.html, printed from the Internet Jan. 15, 2004, 12 pgs.

Hardt et al, "Flysig: Dataflow Oriented Delay-Insensitive Processor for Rapid Prototyping of Signal Processing", (obtained from Internet Dec. 2003), 6 pgs.

Chang et al., "Evaluation of Large Matrix Operations on a Reconfigurable Computing Platform for High Performance Scientific Computations," (obtained from Internet Dec. 2003), 10 pgs.

Altke, "FPGA Configuration Guidelines," XAPP, 090 Nov. 24, 1997, Version 1.1, pp. 31-38.

"XC18V00 Series Of In-System Programmable Configuration PROMs", Xilinx Product Specification, DS026 (v.3.0), Nov. 12, 2001, 19 pages.

Thacker, "System ACE Technology: Configuration Manager Breakthrough", New Technology, FPGA Configuration, Xcell Journal, Summer 2001, pp. 52-55.

"System ACE MPM Solution", Xilinx Product Specification, DS087 (v1.0) Sep. 25, 2001, 29 pgs.

"RapidIO™: An Embedded System Component Network Architecture", Architecture and Systems Platforms, Feb. 22, 2000, 25 pgs.

"Raceway Internlink Functional Specification", Mercury Computer Systems, Inc., Nov. 8, 2000, 118 pgs.

"[XMC-3310] High Speed Transceiver ePMC Module", Spectrum Signal Processing, http://www.spectrumsignal.com/Products/_Datasheets/XMC-3310_datasheet.asp, (©2002-2004), 5 pgs.

"XMC-3310 High Speed Transceiver ePMC Module", Spectrum Signal Processing, Rev. May, 2004, 4 pgs.

RocketIO™ Transceiver User Guide, Xilinx, UG024 (v2.3) Feb. 24, 2004, 152 pgs.

"The FPGA Systems Connectivity Tool", Product Brief, Nallatech, DIMEtalk 2.1, Feb. 2004, pp. 1-8.

B. Hall, "BTeV Front End Readout & Links", BTEV Co., Aug. 17, 2000, 11 pgs.

Irwin, "Usage Models for Multi-Gigabit Serial Transceivers", Xilinx, xilinix.com, White Paper, WP157 (v1.0), Mar. 15, 2002, 10 pgs.

Campenhout, "Computing Structures and Optical Interconnect: Friends or Foes?", Department of Electronics and Information Systems, Ghent University, Obtained from Internet Oct. 8, 2006, 11 pgs.

E. Hazen, "HCAL HO Trigger Link", Optical SLB-HTR Interface Specification, May 24, 2006, 4 pgs.

G. Russell, "Analysis and Modelling of Optically Interconnected Computing Systems", School of Engineering and Physical Sciences, Heriot-Watt University, May 2004, 170 pgs.

Morris et al., "Pipelined Datapath for an IEEE-754 64-Bit Floating-Point Jacobi Solver", Sep. 2005, 2 pgs.

Zhuo et al., "Sparse Matrix-Vector Multiplication on FPGAs", FPGA, Feb. 20-22, 2005, 12 pgs.

Fithian et al., "Iterative Matrix Equation Solver for a Reconfigurable FPGA-Based Hypercomputer", Sep. 2002, 14 pgs.

Kusmanoff et al., "Multi-Phased Computational Reconfiguration", U.S. Appl. No. 12/655,182, filed Dec. 23, 2009; 28 pgs.

* cited by examiner

HETEROGENEOUS COMPUTER ARCHITECTURE BASED ON PARTIAL RECONFIGURATION

FIELD OF THE INVENTION

This invention relates generally to application specific integrated circuit (ASIC) devices, and more particularly to partial reconfiguration of ASIC devices such as field programmable gate array (FPGA) devices.

BACKGROUND OF THE INVENTION

FPGA devices are becoming denser everyday. However, processing device technology is not keeping pace with the need for compiling Very High Speed Integrated Circuit (VHSIC) Hardware Description Language (VHDL) files into a bit file for loading onto today's increasingly dense FPGAs. Partial reconfiguration is a technique that enables the reconfiguration of FPGA hardware without requiring a reset. By providing a FPGA with reconfigurable blocks or modules, it enables the FPGA to continue processing during reconfiguration without interruptions, i.e., part of the FPGA may be reprogrammed with a new function while the remainder of the device continues to run. This allows hardware designs to have dynamically changing components, allowing FPGA resources to be efficiently allocated as processing needs change. However, prior attempts to support partial reconfiguration are awkward to implement and require a dedicated mapping of the individual module to the FPGA device, severely limiting modularity and replacement options. Special tools are required to accomplish these prior designs and I/O mapping limitations limit the distribution of clocks and other critical shared signals, thus requiring each newly reconfigured module to have the same I/O map and I/O functionality as the previous configuration.

Figure 1:
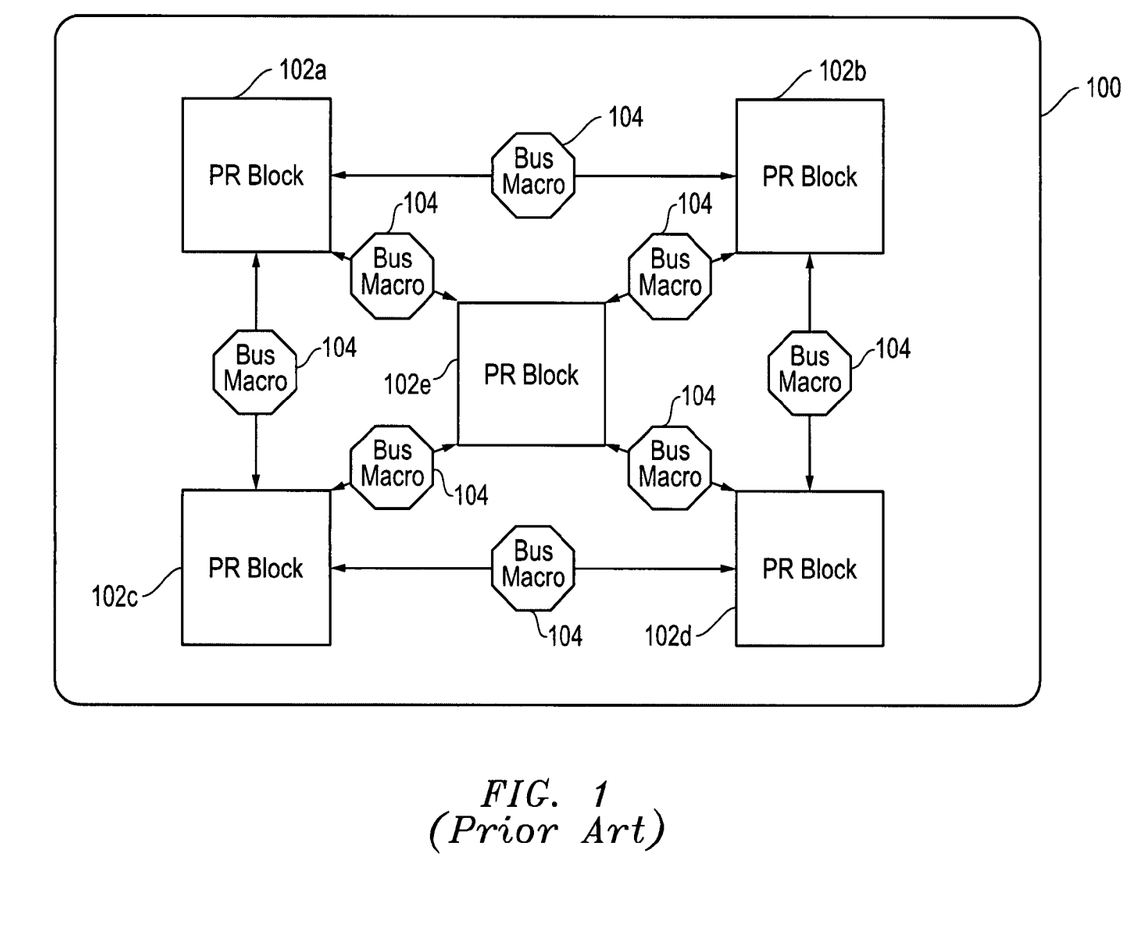
FIG. 1 is a block diagram of a conventional partial reconfiguration communication architecture according to the prior art.

FIG. 1 is a block diagram of a conventional partial reconfiguration communication architecture for a FPGA 100 according to the prior art. As shown in FIG. 1, multiple partial reconfiguration ("PR") blocks 102a-102e are provided and coupled together by bus macros 104. A separate bus macro 104 is required to connect each pair of PR blocks 102, and each given PR block 102 is limited by its bus macro connections to a particular and fixed interconnection position relative to the other PR blocks 102. Multiple bus macros 104 are therefore required per PR block 102. Using the conventional configuration architecture of FIG. 1, the number of bus macros 104 necessary multiplies with the addition of more partial reconfiguration blocks 102. In this regard, bus macros 104 are inefficient in that they can only handle 4 bits per instantiation. Moreover, each type of PR block (e.g., fast Fourier transform "FFT" block or finite impulse response filter "FIR" functionality block) requires a customized interface particular to its given functionality for connection to a corresponding customized bus macro interface.

SUMMARY OF THE INVENTION

Disclosed are systems and methods for partial reconfiguration of programmable and reconfigurable application specific integrated circuit (ASIC) devices including, but are not limited to, Field Programmable Gate Arrays ("FPGAs") or other field programmable devices ("FPDs") or programmable logic devices ("PLDs"). Using the disclosed systems and methods, an interconnection template may be provided that advantageously allows different types of interchangeable partial reconfiguration (IPR) blocks with standardized interfaces to be selectively and dynamically interconnected, disconnected, or interchanged in standardized fashion from communication with a packet router within the same ASIC device, which itself is employed to selectively and dynamically manage communication linkage between each IPR block and other internal circuitry (e.g., including other IPR blocks and/or non-reconfigurable modules) of the ASIC device using packet-ordered communications. The interconnection template may be made temporarily non-reconfigurable relative to the IPR blocks (e.g., such that the position of the template does not change during configuration and reconfiguration of the ASIC device with IPR blocks) or may be permanently non-reconfigurable (e.g., hardwired).

For example, when an IPR block is newly configured and introduced to the ASIC device circuitry, it may be dynamically interconnected to one or more packet routers and other existing circuitry of the same ASIC device using a standardized or "cloned" interface (IF) module of an interconnection template and packetized data transfer protocol that is implemented at a physical software layer, e.g., a physical layer equivalent or analogous to Open System Interconnection (OSI) network layer 1. Advantageously each standardized IF module may also be used to establish interconnection to other types of IPR blocks (e.g., in "lego" or adaptive interlocking fashion) such that the newly configured IPR block of a first type (e.g., FFT block) may replace a previous and different type IPR block (e.g., FIR filter block) at the same template location, and/or such that the newly configured IPR block may be later replaced at the same template location by a subsequent and different type IPR block, unlike different types of conventional PR blocks 102 of FIG. 1 which cannot be so interchanged. The interconnection template in turn provides connection between each so-connected IPR block to the packet router of the reconfigurable ASIC device, with each IPR block sharing a common standardized type of interface to the interconnection template. The template may be temporarily or permanently fixed and non-reconfigurable so that timing is predictable, uniform, and does not change. Further, since each IF module of the template has the same standardized interface configuration, different types of IPR blocks (e.g., having different functionalities) may be dynamically substituted for each other in a given position of the template without recompiling while other portions of the ASIC device circuitry continues operating.

In one exemplary embodiment, a relatively large hardware design may be mapped onto an array of multiple reconfigurable ASIC devices (e.g., FPGAs) and then dynamically and partially reconfigured "on-the-fly" in a "Lego-block" or adaptive-interlocking fashion while other portions of the same ASIC device circuitry continues to operate. As an example, the multiplier resources of a first IPR block used to handle a particular task (e.g., such as Fast Fourier Transform—FFT), may be dynamically substituted at the same template location with multiple resources of a second IPR block capable of performing the particular task in a faster or more efficient manner, e.g., to allow faster operation or to accommodate larger size transforms. As another example, a first IPR block configured to perform a first task (e.g., FFT operation) may be dynamically replaced at the same template location in a given reconfigurable ASIC device with a second and different IPR block configured to perform a second and different task (e.g., low pass filter operation) in real time while other processing modules or circuitry of the same given reconfigurable ASIC continue processing without interruption or need for recompilation. Advantageously, the interconnection template and packet router of the disclosed systems and methods may be implemented in a manner that reduces the amount of code and consequently required coding time relative to conventional partial reconfiguration schemes.

In a further exemplary embodiment, each IPR block may be pre-compiled and stored in memory to form a library of multiple available functions. This library may be accessed to allow a user to dynamically customize the ASIC application, e.g., without needing any knowledge of Very High Speed Integrated Circuit (VHSIC) Hardware Description Language (VHDL). Any suitable methodology or configuration may be provide to allow a user to access the library and configure or reconfigure an ASIC device with IPR blocks, e.g., a Graphical User Interface (GUI) may be provided to program or re-program IPR block functions.

In one respect, disclosed herein is a method for partially reconfiguring a reconfigurable application specific integrated circuit (ASIC), including: providing a reconfigurable ASIC device; configuring the ASIC device with an interconnection template that includes at least one packet router coupled to one or more interface (IF) modules of physically-fixed location; providing the ASIC device with existing circuitry coupled to the packet router that is configured to execute one or more functions; and then dynamically reconfiguring the ASIC device by connecting a pre-compiled interchangeable partial reconfiguration (IPR) block to the physically-fixed location of at least one of the IF modules at the same time that other existing circuitry of an other portion of the ASIC device is executing and without re-compiling the other portion of the ASIC device.

In another respect, disclosed herein is a reconfigurable application specific integrated circuit (ASIC) device, including: an interconnection template that includes at least one packet router coupled to one or more interface (IF) modules of physically-fixed location; and existing circuitry coupled to the packet router that is configured to execute one or more functions; wherein the ASIC device is dynamically and partially reconfigurable by connection of a pre-compiled interchangeable partial reconfiguration (IPR) block to the physically-fixed location of at least one of the IF modules at the same time that other existing circuitry of an other portion of the ASIC device is executing and without re-compiling the other portion of the ASIC device.

In another respect, disclosed herein is a system for partially reconfiguring an application specific integrated circuit (ASIC) device, including: a computer processing system including non-volatile memory, the computer processing system being coupled to an ASIC device across a programming configuration interface; a library of stored multiple available precompiled interchangeable partial reconfiguration (IPR) blocks stored in the non-volatile memory; wherein the ASIC device includes an interconnection template that includes at least one packet router coupled to one or more interface (IF) modules of physically-fixed location, existing circuitry of the ASIC device being coupled to the packet router that is configured to execute one or more functions; and wherein the computer processing system is configured to dynamically reconfigure the ASIC device across the programming interface to connect a pre-compiled IPR block selected from the library connected at a physically-fixed location of at least one of the IF modules at the same time that other existing circuitry of an other portion of the ASIC device is executing and without re-compiling the other portion of the ASIC device.

DESCRIPTION OF ILLUSTRATIVE EMBODIMENTS

Figure 2:
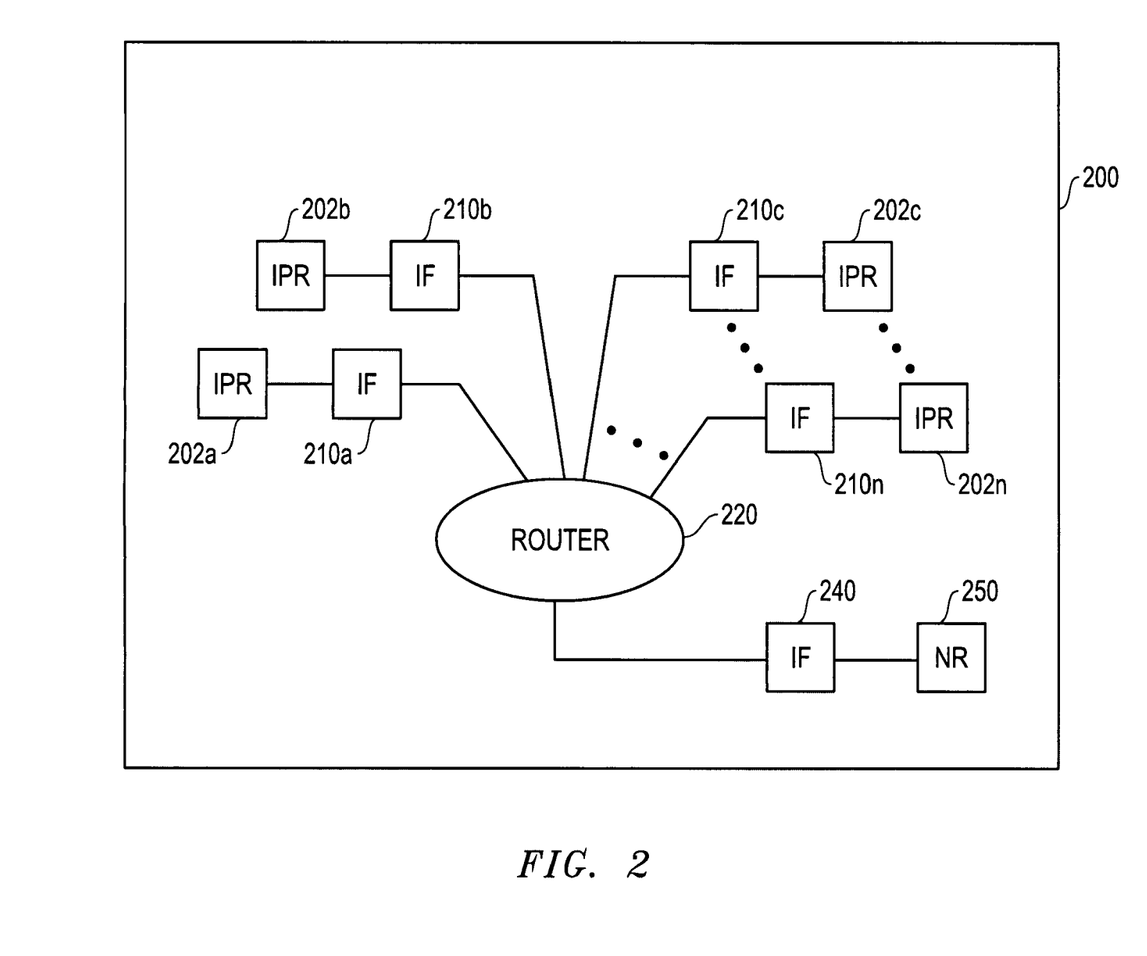
FIG. 2 illustrates an ASIC device configured according to one exemplary embodiment of the disclosed systems and methods.

FIG. 2 illustrates an at least partially reconfigurable ASIC device 200 (e.g., FPGA, FPD, PLD, hybrid device, etc.) having an interconnection template that includes a packet router 220 and attached interface (IF) modules 210a to 210n, and 240. Each of interface modules 210a-210n is in turn coupled to a respective one of interchangeable IPR blocks 202a-202n as shown. It will be understood that the illustrated number of interface modules 210 and IPR blocks 202 is exemplary only, and that any number of one or more IPR blocks 202 may be coupled by a respective interface module 210 to a packet router 220. Each of IPR blocks 202 may be a module configured to execute or perform one or more tasks (e.g., fast fourier transform "FFT" processing, low pass filter, Local Area Network "LAN" interface, Universal Serial Bus "USB" interface, Universal Asynchronous Receiver-Transmitter "UART", etc.).

As also shown in FIG. 2, one or more non-reconfigurable (NR) blocks 250 (e.g., hardwired microprocessor core, etc.) may also be optionally coupled to packet router 220 via optional IF module 240. For example, in one exemplary embodiment, a hybrid processing device of reconfigurable and non-reconfigurable components may be implemented by providing a non-reconfigurable (NR) block 250 in the form of a hardwired high performance microprocessor core and an IPR block 202 may be provided as a reconfigurable external interface (e.g., that is dynamically reconfigurable between a number of external interfaces such as local area network "LAN" Ethernet interface, universal serial bus "USB" interface, etc.). In such an embodiment, a hardwired microprocessor may be advantageously provided with dynamically external interface.

In the exemplary embodiment of FIG. 2, packet router 220 is a non-reconfigurable addressable switch that may be configured to function, for example, as a packet router interface switch matrix ("PRISM") such as described in U.S. Pat. No. 7,444,454, which is incorporated herein by reference in its entirety. Further, each of terminal interface modules 210a-210n provides a non-reconfigurable and standardized interface having the capability for dynamically connecting packet router 220 to multiple types of function blocks or modules of the ASIC 200, e.g., IPR blocks 202, NR blocks 250, etc. In such a configuration, packet router 220 may be configured to process multiple simultaneous requests for transfer of data packets between destinations (e.g., between given pairs of IPR blocks 202), and to determine a destination/s for each given data packet from a routing code contained within a header of the given data packet and to transmit the data packet from a source IPR block 202 to one or more other destination IPR blocks 202 based on the destination/s so determined from the routing code contained within the header of the first data packet.

Still referring to FIG. 2, each interface (IF) module 210 may be configured to function, for example, as described in U.S. Pat. No. 7,444,454, which has been incorporated herein by reference in its entirety. In addition to providing connection to IPR blocks 202, IF modules 210 may also be employed to connect a packet router 220 to external interfaces (e.g., multi-gigabit serial transceiver interfaces), card-level interface/s, processor/s, user-defined function/s, etc. of ASIC 200 via source first-in first out (FIFO) interfaces and destination FIFO interfaces. In this regard, each IF module 210 may be provided with a read port and a write port, and packet router 220 may be configured to see these read and write interface ports as packet sources and destinations.

Figure 3:
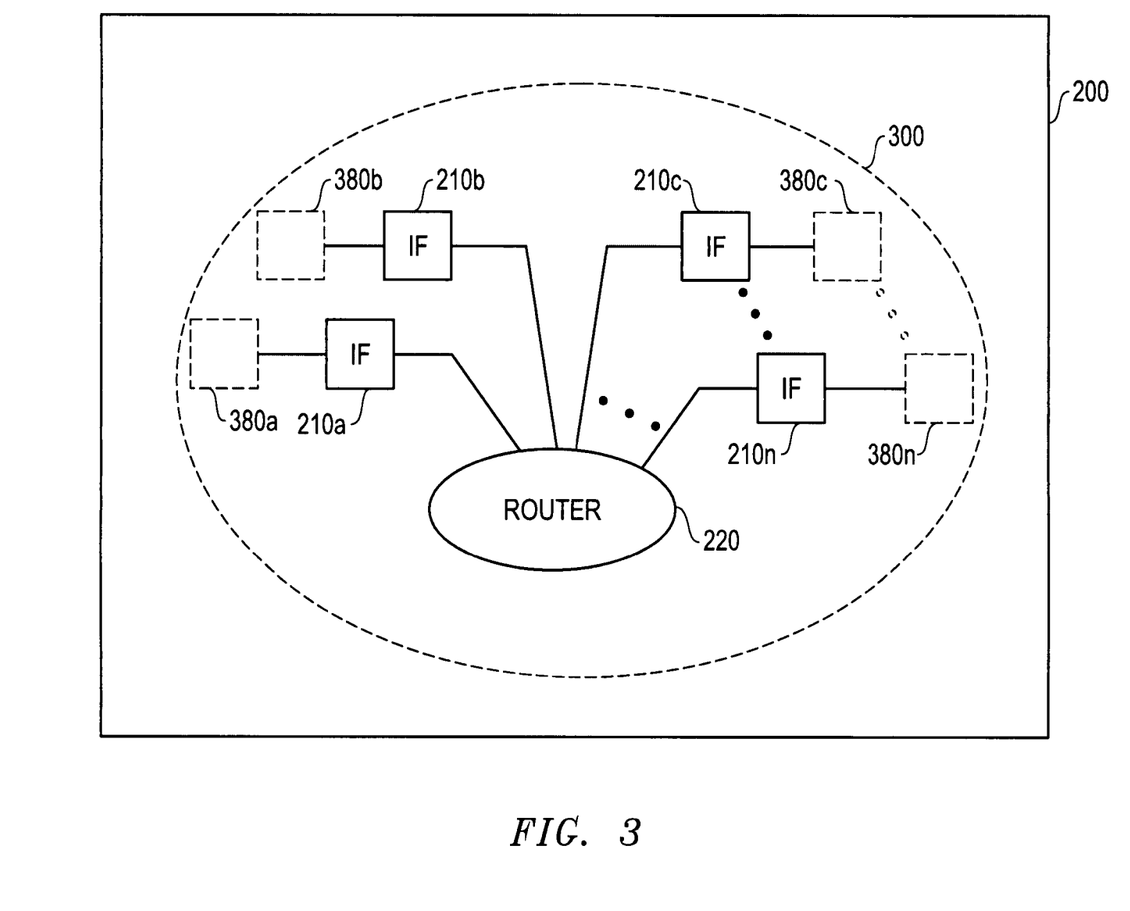
FIG. 3 illustrates an ASIC device configured with an interconnection template according to one exemplary embodiment of the disclosed systems and methods.

To initially configure reconfigurable ASIC device 200 of FIG. 2, at least one packet router 220 may be initially loaded (e.g., via a suitable configuration interface) onto the ASIC device 200 with one or more connected terminal IF modules 210 to form an interconnection template 300 as illustrated in FIG. 3. By "terminal" it is meant that an IF module has a physically-fixed location 380 in the ASIC device matrix at the edge of the interconnection template that is available for interconnection to other circuitry, e.g., an IPR block 202. The number and location of IF modules 210 may be selected to provide a desired number of communication endpoints of known location, and such that communication routing utilizeds a minimum amount of area within the ASIC circuitry. Each of IF modules 210a to 210n of template 300 presents a respective known physically-fixed location 380a to 380n for future interconnection with a given chosen IPR block 202 using a standardized interface protocol. In this regard, one or more IPR blocks 202 may be later loaded onto the ASIC device 200 to achieve the configuration illustrated and described in relation to FIG. 2.

After loading the IPR blocks 202, data packets (e.g., PRISM data packets) transferred between a packet router 220 and each IPR block 202 only need to change their headers once from any previous IPR block destination code to the destination code of the newly configured IPR block 202. After interconnection template 300 is located onto reconfigurable ASIC device 200, one or more reconfigurable IPR blocks 202 may be loaded (e.g., via a suitable configuration interface) onto ASIC device 200 and connected to a corresponding IF module 210 as shown in FIG. 2. Each time a given IPR block 202 is dynamically reconfigured while ASIC processing operations are running, the unaffected (unchanged) portions of the ASIC device 200 do not need to be recompiled. Furthermore the packet router may immediately begin communicating data packets (when the packets are ready) to a newly reconfigured IPR block 202, rather than waiting on bus communication or other hardware to disconnect or otherwise become ready (e.g., tri-stated, etc.) as is required for conventional partial reconfiguration systems.

Returning to FIG. 2, each packet router 220 automatically handles and routes data packets (e.g., PRISM packets) to and from the IPR blocks appropriately, e.g., to provide connection between any given pair of the IPR blocks 202 without the need for a separate interconnection path directly between the IPR blocks 202. This prevents the need for multiple interconnection paths to each IPR block 220, although an IPR block 220 may be optionally provided with multiple interconnection paths (e.g., coupled to multiple IF modules 210), and/or interconnected directly to another IPR block 220 if so desired.

In the configuration of FIG. 2, each IPR block 202 may communicate with any other IPR block 202 through packet router 220, creating a single interface for each IPR block, which makes this system extremely scalable. For example, when a new IPR block 202 is introduced, the change to the packet router 220 is minimal and no new bus macros or other new communication links need to be created to connect the new IPR block 202 with other IPR blocks 202. For example, a given IPR block 202 having a first functionality (e.g., LAN interface functionality) may be dynamically reconfigured in a seamless manner to perform a second functionality (e.g., USB interface functionality) while maintaining the same IF module 210 for communications with packet router 220. Because the location of each IF module 210 may be physically fixed, timing and source and destination routing for packets between packet router 220 and the given IPR block 202 remains the same during reconfiguration of the given IPR block 202.

Figure 4:
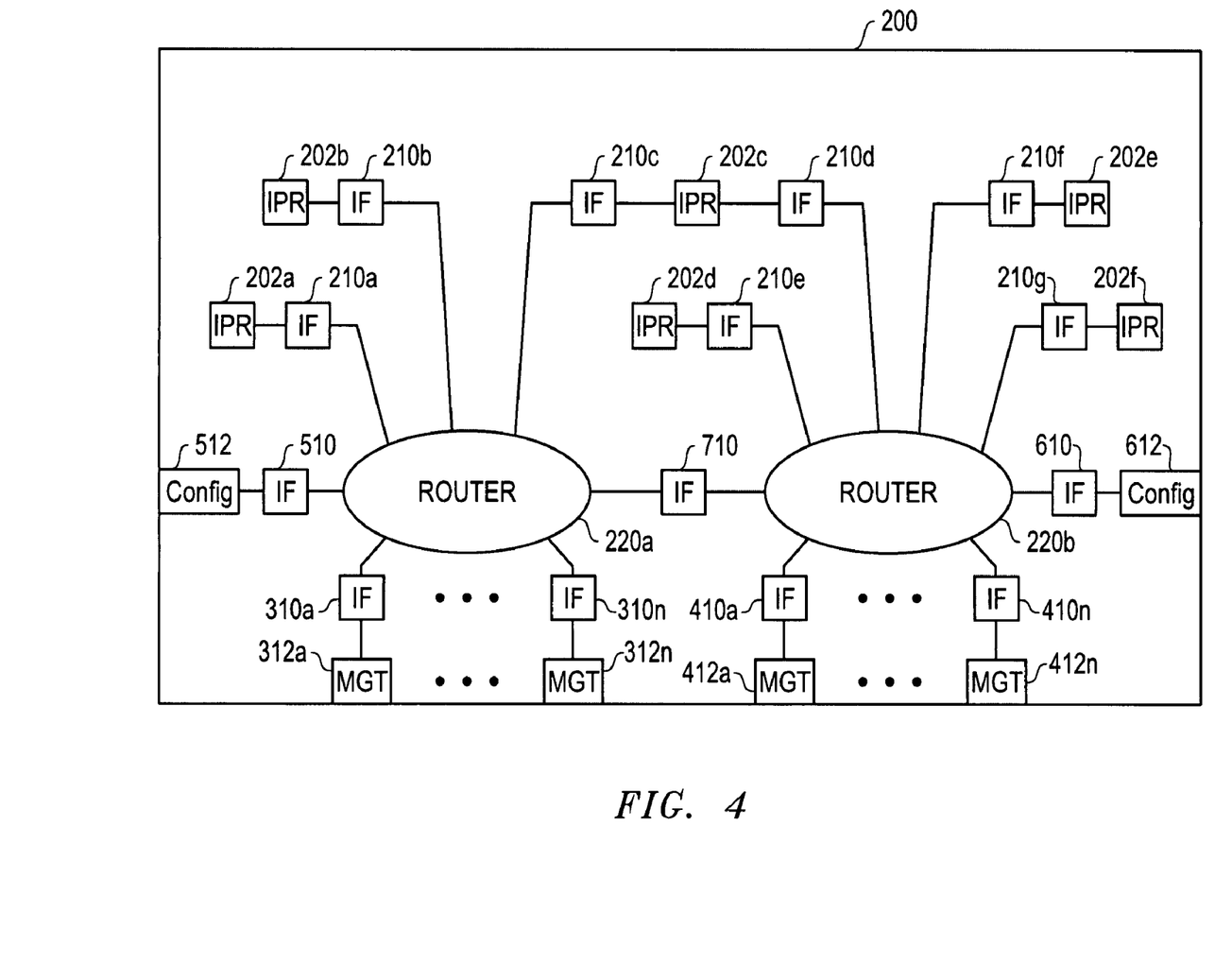
FIG. 4 illustrates an ASIC device configured according to one exemplary embodiment of the disclosed systems and methods.

It will be understood that the configuration of FIG. 2 is exemplary only and that multiple packet routers may be optionally present, and/or differing numbers of IF modules 210 and IPR blocks 202 may be employed. For example, FIG. 4 illustrates another exemplary embodiment of a reconfigurable ASIC device 200 which in this case has an interconnection template that includes two packet routers 220a and 220b that are interconnected by an intermediate interface module 710 that exists within the interconnection template between the two packet routers 220a and 220b. The interconnection template also includes interface modules 210a-210c that are coupled to packet router 220a and interface modules 210d-210g that are coupled to packet router 220b. In this configuration, data packets may be exchanged between sources and destinations across each of IF modules 210 and 710. Also shown is interconnection of a single IPR block 202c to multiple interface modules 210c and 210d, e.g., to increase bandwidth capability. It will be understood that a single IPR block 202 may be coupled by two or more interface modules 210 to one or more packet routers 220 in a similar fashion.

Also shown present in FIG. 4 are optional interface modules 310a-310n that each serves to couple packet router 220a to respective external I/O connection, in this case a high speed serial connection that is a multi-gigabit serial transceiver ("MGT") 312a-312n, though any other type of external I/O interconnection may be present. Similarly, optional interface modules each of 410a-410n serves to couple packet router 220b to respective MGTs 412a-412n. External connections such as MGTs 312 and 412 may be optionally provided for purposes of coupling packet routers 202a and 202b to external devices, e.g., such as inter-ASIC (e.g., inter-FPGA) interfaces to packet routers of other separate ASIC (e.g., FPGA) devices. In this manner, data packets may be routed, for example, between any given IPR block of a first reconfigurable ASIC device 200 to any given IPR blocks of a second reconfigurable IPR block. FIG. 4 also illustrates IF modules 510 and 610 which each couple one of routers 220a or 220b to a respective configuration interface 512 or 612. Configuration interfaces 512 and 612 may be, for example, IEEE 1149 (Joint Test Action Group—"JTAG") port interfaces and/or synchronous serial interfaces. Configuration interfaces 512 and 612 may be employed for configuration of template 300 or for provisioning and reconfiguring of IPR blocks 202.

Figure 5:
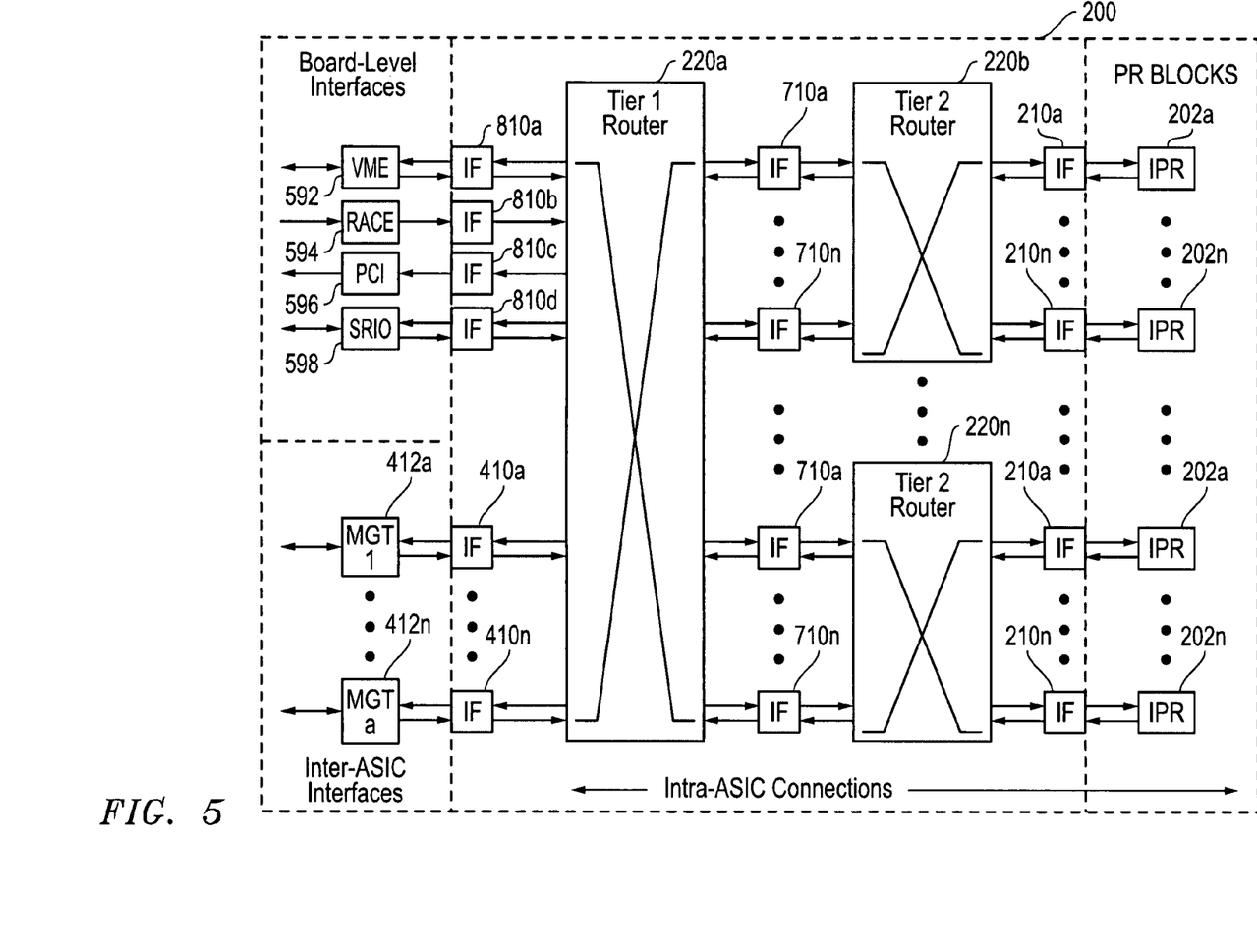
FIG. 5 illustrates an ASIC device configured according to one exemplary embodiment of the disclosed systems and methods.

FIG. 5 illustrates another exemplary embodiment of a reconfigurable ASIC device 200 employing multiple packet routers 220 in a tiered hierarchy. As shown, in this embodiment ASIC 200 includes a first tier packet router 220a that is coupled to standardized IF modules 810a to 810d, which are in turn coupled to various board level interfaces, in this case, VERSA-Module Europe ("VME") interface 592, Race interface 594, Peripheral Component Interconnect ("PCI") interface 596, and Serial Rapid IO (SRIO) interface 598. As shown, a given IF module 710 may be unidirectional (including source and destination interface functions for packet router 220) or may be bidirectional (including only one of source or destination functions for packet router 220). It will be understood that each of IF modules 210, 310, 410, 510, 610, 710 and 810 described herein are standardized relative to each other and, as such, may share the same unidirectional or bidirectional configuration as desired.

Still referring to FIG. 5, first tier packet router 220a is also coupled in this embodiment to external MGT interfaces 412a-412n by respective IF modules 410a-410n. As further shown, first tier packet router 220a is coupled to each of multiple second tier routers 220b-220n by respective intermediate IF modules 710a-710n. Each of second tier routers 220 may or may not be configured with the same routing capability as first tier router 220a. Each of second tier routers 220b-220n is further coupled to multiple IPR blocks 202a-202n. In such a configuration, data packets may be routed based on packet header information from any given IPR block 202 of a given second tier router 220 to any other one or more IPR block/s 202 of one or more other second tier routers 220 through first tier router 220a, or from any given IPR block 202 of a given second tier router 220 to any other one or more IPR block/s 202 of the same second tier router 220. Further, data packets may be routed back and/or forth between any one or more of board-level interfaces and any one or more external (e.g., inter-ASIC) interfaces. Similarly, data packets may be routed back and/or forth between any one or more of IPR blocks 202 of second tier routers 220b-220n and any one or more of board-level interfaces or external (e.g., inter-ASIC) interfaces. Thus a tiered router hierarchy such as illustrated in FIG. 5 may be implemented for purposes of expanding the number of possible router ports and/or for reducing bandwidth load on the first tier router 220a since it does not need to route data packet communications between all IPR blocks 202. It will be understood that one or more additional tiers of routers may be provided, e.g., a third tier of routers 220 may be coupled by IF modules 210 to one or more second tier modules, etc.

Figure 6:
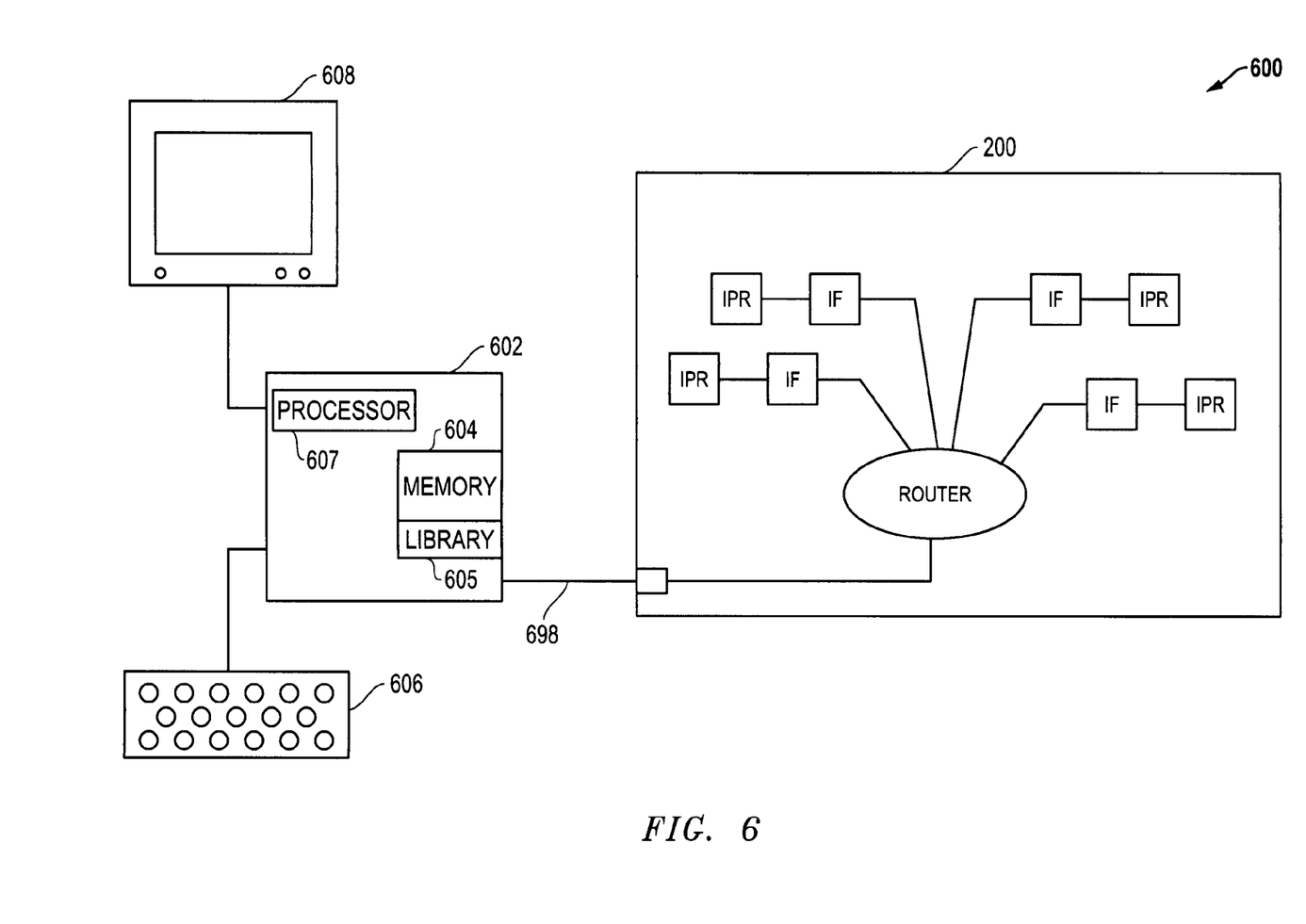
FIG. 6 illustrates a system configured for performing partial reconfiguration of an ASIC device according to one exemplary embodiment of the disclosed systems and methods.

FIG. 6 illustrates a data processing system 600 that includes a computer processing system 602 coupled by a datapath 698 to a reconfigurable ASIC device 200 for performing partial reconfiguration of the ASIC device 200 according to one exemplary embodiment. As shown in FIG. 6, a library 605 may be stored in non-volatile memory 604 of a personal computer or other suitable computer processing system 602. Library 605 may contain multiple available functions as IPR blocks (e.g., fast Fourier transform "FFT" block, low pass filter block, Local Area Network "LAN" interface block, Universal Serial Bus "USB" interface block, Universal Asynchronous Receiver-Transmitter "UART" block, etc.) as elements in the form of pre-compiled "bit files" intended for placement into one of the IF module connection "sockets" provided by the infrastructure of the interconnection template 300. In this regard, a selected bit file may be supplied dynamically during to the ASIC device 200 through datapath 698 and the normal programming configuration interface of ASIC device 200, e.g., a configuration interface 512 or 612 such as previously described. As further shown, computer processing system 602 may include a processor device 607 (e.g., CPU) configured to execute programming that presents a partial reconfiguration graphical user interface (GUI) to a user on display 608. A user may utilize the one or more I/O devices 606 (e.g., keyboard, mouse, etc.) of the computer processing system 602 to select particular bit files for initial configuration or partial reconfiguration of ASIC device 200 with one or more IPR blocks 202, e.g., without needing any knowledge of VHDL. In addition to the reconfiguration GUI, computer processing system 602 may also optionally run any other development tools required for programming of ASIC device 200.

The disclosed systems and methods may be advantageously implemented for a variety of partial reconfiguration computational tasks. Further information on an example of such tasks may be found in concurrently filed U.S. patent application Ser. No. 12/655,182 entitled "Multi-Phased Computation Reconfiguration" by Kusmanoff, et al., which is filed on the same day as the present patent application and which is incorporated herein by reference in its entirety.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for partially reconfiguring a reconfigurable application specific integrated circuit (ASIC), comprising:
   providing a reconfigurable ASIC device;
   configuring the ASIC device with an interconnection template that includes at least one packet router coupled to one or more interface (IF) modules of physically-fixed location;
   providing the ASIC device with existing circuitry coupled to the packet router that is configured to execute one or more functions; and
   then dynamically reconfiguring the ASIC device by connecting a pre-compiled interchangeable partial reconfiguration (IPR) block to the physically-fixed location of at least one of the IF modules at the same time that other existing circuitry of an other portion of the ASIC device is executing and without re-compiling the other portion of the ASIC device.

2. The method of claim 1, wherein the ASIC device comprises a FPGA device.

3. The method of claim 1, further comprising selecting multiple physically-fixed locations for IF modules; and configuring the ASIC device with an interconnection template that includes at least one packet router coupled to the multiple IF modules at the selected physically-fixed locations to provide a desired number of communication endpoints of known location for future interconnection; each of the multiple IF modules using a standardized interface protocol for data packet communication with the packet router.

4. The method of claim 3, wherein the packet router is configured to communicate data packets with each of the multiple IF modules using a packetized data transfer protocol that is implemented at the physical software layer.

5. The method of claim 1, further comprising selecting a number of locations and IF modules for the interconnection template that minimizes the amount of ASIC circuitry area utilized by the interconnection template.

6. The method of claim 1, further comprising:
   configuring the ASIC device with an interconnection template that includes multiple packet routers coupled together in a hierarchical configuration by multiple intermediate IF modules of physically-fixed location, a first one of the multiple packet routers being a first tier packet router coupled by multiple IF modules to at least two other second tier packet routers, each of the second tier packet routers being coupled to multiple terminal IF modules; and then dynamically reconfiguring the ASIC device by connecting a pre-compiled IPR block to each of one or more of the physically-fixed locations of the multiple terminal IF modules at the same time that other existing circuitry of an other portion of the ASIC device is executing and without re-compiling the other portion of the ASIC device.

7. The method of claim 1, further comprising:

configuring the ASIC device with an interconnection template that includes at least one packet router coupled to multiple IF modules of physically-fixed location; and then dynamically reconfiguring the ASIC device by connecting a pre-compiled IPR block to each of one or more of the physically-fixed locations of the multiple IF modules at the same time that other existing circuitry of an other portion of the ASIC device is executing and without re-compiling the other portion of the ASIC device;

then dynamically configuring or reconfiguring the ASIC device by connecting a pre-compiled IPR block to the physically-fixed location of at least one of the IF modules at the same time that other existing circuitry of an other portion of the ASIC device is executing and without re-compiling the other portion of the ASIC device;

wherein the packet router is configured to process multiple simultaneous requests for transfer of data packets between the multiple IPR blocks; and wherein the packet router is configured to determine a destination or destinations for each given data packet from a routing code contained within a header of the given data packet and to transmit the data packet from a source IPR block to one or more other destination IPR blocks based on the destination or destinations so determined from the routing code contained within the header of the given data packet.

8. The method of claim 1, wherein the one or more IF modules are each provided with a read port and a write port; and wherein the packet router is configured to see the read and write ports of each IF module as respective packet sources and packet destinations.

9. The method of claim 1, further comprising pre-compiling a stored library of multiple available IPR blocks; selecting a given IPR block; and then dynamically reconfiguring the ASIC device with the selected given pre-compiled IPR block at the same time that an other portion of the ASIC device is executing and without re-compiling the other portion of the ASIC device, or a combination thereof.

10. The method of claim 9, further comprising providing a library of pre-compiled available IPR blocks in non-volatile memory of a computer processing system, each of the multiple available pre-compiled IPR blocks being pre-compiled bit files; accepting a user selection of a given IPR block of the library from an input/output (I/O) device of the computer processing system input using a graphical user interface (GUI); and then supplying the selected pre-compiled IPR block to the ASIC device through a programming configuration interface of the ASIC device for the dynamic reconfiguration of the ASIC device.

11. The method of claim 1, wherein the ASIC device is a reconfigurable hybrid device and wherein the step of providing the ASIC device with existing circuitry coupled to the packet router further comprises connecting a non-reconfigurable (NR) block to the physically-fixed location of at least one of the IF modules.

12. A reconfigurable application specific integrated circuit (ASIC) device, comprising:

an interconnection template that includes at least one packet router coupled to one or more interface (IF) modules of physically-fixed location; and existing circuitry coupled to the packet router that is configured to execute one or more functions;

wherein the ASIC device is dynamically and partially reconfigurable by connection of a pre-compiled interchangeable partial reconfiguration (IPR) block to the physically-fixed location of at least one of the IF modules at the same time that other existing circuitry of an other portion of the ASIC device is executing and without re-compiling the other portion of the ASIC device.

13. The device of claim 12, wherein the ASIC device comprises a FPGA device.

14. The device of claim 12, wherein the interconnection template includes at least one packet router coupled to the multiple IF modules at selected physically-fixed locations to provide a desired number of communication endpoints of known location for future interconnection, each of the multiple IF modules using a standardized interface protocol for data packet communication with the packet router.

15. The device of claim 14, wherein the packet router is configured to communicate data packets with each of the multiple IF modules using a packetized data transfer protocol that is implemented at the physical software layer.

16. The device of claim 12, wherein the interconnection template includes a number of locations and IF modules that are selected to minimize the amount of ASIC circuitry area utilized by the interconnection template.

17. The device of claim 12, wherein the interconnection template includes multiple packet routers coupled together in a hierarchical configuration by multiple intermediate IF modules of physically-fixed location, a first one of the multiple packet routers being a first tier packet router coupled by multiple IF modules to at least two other second tier packet routers, each of the second tier packet routers being coupled to multiple terminal IF modules; and wherein the ASIC device is dynamically reconfigurable by connection of a pre-compiled IPR block to each of one or more of the physically-fixed locations of the multiple terminal IF modules at the same time that other existing circuitry of an other portion of the ASIC device is executing and without re-compiling the other portion of the ASIC device.

18. The device of claim 12, further comprising:

an interconnection template that includes at least one packet router coupled to multiple IF modules of physically-fixed location; and wherein the ASIC device is dynamically and partially reconfigurable by connection of a pre-compiled IPR block to each of one or more of the physically-fixed locations of the multiple IF modules at the same time that other existing circuitry of an other portion of the ASIC device is executing and without re-compiling the other portion of the ASIC device;

wherein the packet router is configured to process multiple simultaneous requests for transfer of data packets between the multiple IPR blocks; and wherein the packet router is configured to determine a destination or destinations for each given data packet from a routing code contained within a header of the given data packet and to transmit the data packet from a source IPR block to one or more other destination IPR blocks based on the destination or destinations so determined from the routing code contained within the header of the given data packet.

19. The device of claim 12, wherein the one or more IF modules are each provided with a read port and a write port; and wherein the packet router is configured to see the read and write ports of each IF module as respective packet sources and packet destinations.

20. The method of claim 12, wherein the ASIC device is a reconfigurable hybrid device; and wherein the existing circuitry coupled to the packet router comprises at least one non-reconfigurable (NR) block connected to the physically-fixed location of at least one of the IF modules.

21. A system for partially reconfiguring an application specific integrated circuit (ASIC) device, comprising:
- a computer processing system including non-volatile memory, the computer processing system being coupled to an ASIC device across a programming configuration interface;
- a library of stored multiple available precompiled interchangeable partial reconfiguration (IPR) blocks stored in the non-volatile memory;
- wherein the ASIC device includes an interconnection template that includes at least one packet router coupled to one or more interface (IF) modules of physically-fixed location, existing circuitry of the ASIC device being coupled to the packet router that is configured to execute one or more functions; and
- wherein the computer processing system is configured to dynamically reconfigure the ASIC device across the programming interface to connect a pre-compiled IPR block selected from the library connected at a physically-fixed location of at least one of the IF modules at the same time that other existing circuitry of an other portion of the ASIC device is executing and without re-compiling the other portion of the ASIC device.

22. The system of claim 21, wherein the computer processing system is configured to receive a user selection of the pre-compiled IPR block of the library from an input/output (I/O) device of the computer processing system input by a user using a graphical user interface (GUI).

* * * * *